United States Patent
Lee et al.

(10) Patent No.: US 10,581,524 B2
(45) Date of Patent: Mar. 3, 2020

(54) LUMINAIRE POSITIONING SYSTEM AND METHOD THEREOF

(71) Applicants: Industrial Technology Research Institute, Hsinchu (TW); Changhua Christian Hospital, Changhua (TW)

(72) Inventors: Chun-Hsing Lee, Hsinchu (TW); Chia-Fen Hsieh, Hsinchu County (TW); Hsi-Ching Huang, Changhua County (TW); Shou-Jen Kuo, Changhua County (TW)

(73) Assignees: Industrial Technology Research Institute, Hsinchu (TW); Changhua Christian Hospital, Changhua (CN)

(*) Notice: Subject to any disclaimer, the term of this patent is extended or adjusted under 35 U.S.C. 154(b) by 0 days.

(21) Appl. No.: 15/927,065

(22) Filed: Mar. 20, 2018

(65) Prior Publication Data

US 2018/0212680 A1   Jul. 26, 2018

Related U.S. Application Data

(63) Continuation of application No. 15/390,745, filed on Dec. 27, 2016, now Pat. No. 9,954,614.

(Continued)

(30) Foreign Application Priority Data

Jul. 25, 2016  (TW) .............................. 105123375 A

(51) Int. Cl.
  *H04W 4/02* (2018.01)
  *H04B 10/116* (2013.01)
  (Continued)

(52) U.S. Cl.
  CPC ........... *H04B 10/116* (2013.01); *G08C 17/02* (2013.01); *G08C 21/00* (2013.01); *H04W 4/023* (2013.01); *H04W 4/33* (2018.02)

(58) Field of Classification Search
  CPC .............................. H04W 4/03; G01C 21/206
  See application file for complete search history.

(56) References Cited

U.S. PATENT DOCUMENTS

2004/0100377 A1* 5/2004 Brackett ............. G07C 9/00111
    340/539.13
2014/0372072 A1* 12/2014 Guo ..................... H04B 10/116
    702/150
(Continued)

FOREIGN PATENT DOCUMENTS

CN    1926790       3/2007
CN    103383446     11/2013
(Continued)

OTHER PUBLICATIONS

"Office Action of Taiwan Counterpart Application," dated Mar. 13, 2018, p. 1-p. 5, in which the listed references were cited.
(Continued)

*Primary Examiner* — Kevin Kim
(74) *Attorney, Agent, or Firm* — JCIPRNET

(57) ABSTRACT

A positioning system by visible light includes at least one luminaire, at least one positioning transceiver and a server. The luminaire is disposed at a specific position and has a first identification code, and emits the first identification code in a selected signal form. Each positioning transceiver has a second identification code, and further includes a receiving device and a wireless transceiver. The receiving device movably receives the first identification and demodulates the first identification code. The wireless transceiver transmits the first and the second identification codes to a receiving terminal. The server is coupled to the at least one positioning transceiver via the receiving terminal, and obtains the first and the second identification codes so as to position the at least one positioning transceiver in a space defined by the at least one luminaire.

11 Claims, 4 Drawing Sheets

Related U.S. Application Data

(60) Provisional application No. 62/319,812, filed on Apr. 8, 2016.

(51) Int. Cl.
*G08C 17/02* (2006.01)
*G08C 21/00* (2006.01)
*H04W 4/33* (2018.01)

(56) References Cited

U.S. PATENT DOCUMENTS

2015/0229392 A1* 8/2015 Ikehara ............... H04B 10/116 398/202
2015/0365173 A1* 12/2015 Yamasaki ........ H04B 10/1149 398/126

FOREIGN PATENT DOCUMENTS

| | | |
|---|---|---|
| CN | 203519822 | 4/2014 |
| CN | 103823204 | 5/2014 |
| CN | 103856265 | 6/2014 |
| CN | 104567853 | 4/2015 |
| CN | 204481818 | 7/2015 |
| CN | 105353347 | 2/2016 |
| CN | 105509734 | 4/2016 |
| CN | 105783914 | 7/2016 |
| EP | 1242944 | 9/2002 |
| TW | M457260 | 7/2013 |

OTHER PUBLICATIONS

"Office Action of China Counterpart Application," dated Nov. 21, 2019, p. 1-p. 16.

* cited by examiner

LUMINAIRE POSITIONING SYSTEM AND METHOD THEREOF

CROSS-REFERENCE TO RELATED APPLICATION

This application is a continuation application of and claims the priority benefit of a prior application Ser. No. 15/390,745, filed on Dec. 27, 2016, now allowed. The prior application Ser. No. 15/390,745 claims the priority benefits of U.S. provisional application Ser. No. 62/319,812, filed on Apr. 8, 2016 and Taiwan application serial no. 105123375, filed on Jul. 25, 2016. The entirety of each of the above-mentioned patent applications is hereby incorporated by reference herein and made a part of this specification.

TECHNICAL FIELD

The disclosure relates to a positioning system and a positioning method.

BACKGROUND

For an indoor operating organization such as hospital, there are a large number and variety of movable medical equipment. The medical equipment is often movable not only to cope for health care in the hospital but also to monitor patients of different situations at any time. In general, it is difficult to control the motion of the medical equipment and staff effectively.

For another example, the process of controlling the motion of the medical equipment and staff will still be pretty complicated and time-consuming when the medical staff shifts the responsibility on the medical equipment. Generally, a variety of medical equipment such as physiological monitors, fetal ultrasound monitors, perfusion pump, and blood glucose meter, etc., will be scattered in any hospital ward. The medical staffs need to make an inventory for the medical equipment one by one for each hospital ward. Therefore, the process is time-consuming.

Hospital is one exemplary case and other similar organizations also have similar operating problems. In other words, when there are a large number and variety of equipment and staff to be controlled their motions, it will fail to timely control the above-mentioned problems effectively. Because the hospital is an indoor environment, it could not be defined a position by a global positioning system (GPS).

Thus, in the indoor environment, how to master the motion of equipment and/or staff effectively is one of the management issues to be addressed.

SUMMARY

The disclosure is directed to a positioning system and a positioning method.

In an embodiment of the disclosure, a positioning system comprises at least one luminaire, at least one positioning transceiver, a server, and a display unit. The luminaire produces at least one optical signal, having a first identification code in correspondingly illuminating. The positioning transceiver receives the optical signal, and transmits the first identification code and a second identification code corresponding to the positioning transceiver. The server receives the first identification code and the second identification code, so to position the positioning transceiver according to the first identification code and the second identification code. The display unit is configured to display a location of the positioning transceiver.

The foregoing will become better understood from a careful reading of a detailed description provided herein below with appropriate reference to the accompanying drawings.

DETAILED DESCRIPTION OF DISCLOSED EMBODIMENTS

Figure 1:
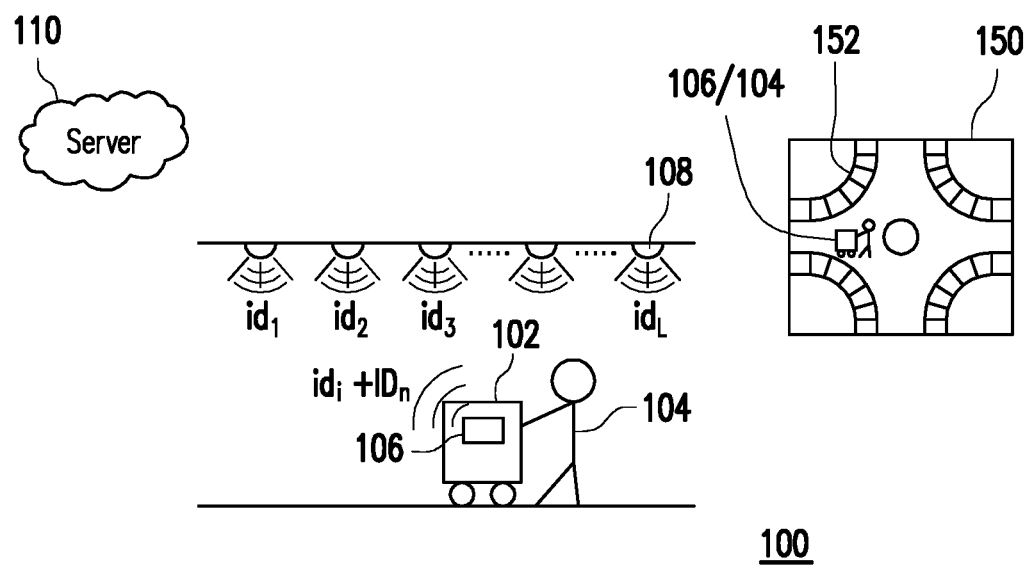
FIG. 1 illustrates a schematic diagram of a positioning system according to one embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosed mechanism to expose the visible target, which utilizes at least one lighting device such as luminaire disposed at least one fixed position in a space, may provide at least one reference point of the positions for equipment or personnel-in the space.

The disclosed luminaire such as the use of controlling the light-emitting form of the luminaire and generating the light signal of pulse form, so as to emit a specific identification code of the luminaire. In addition, at least one positioning transceiver may be provided, and disposed in the movable equipment or carried by the staff member to receive an identification code of a corresponding neighboring luminaire. This positioning transceiver itself also has another identification code. Accordingly, the positioning transceiver transmits the identification code of the luminaire and the identification code of itself to a server, such as via a connection of a wireless network. Therefore the server may position the positioning transceiver, and then provide the positioning information.

With reference to the attached drawings, the disclosure will be described in the following exemplary embodiments, but the scope of the disclosure is not limited to the exemplary embodiments set forth herein.

FIG. 1 illustrates a schematic diagram of a positioning system according to one embodiment of the disclosure. Referring to FIG. 1, the positioning system 100 include at least one luminaire 108 (for example, a plurality of luminaires), at least one position transceiver 106 and a server 110. The server 110, for example, may be a cloud server. Each of the at least one luminaire 108 is disposed at a specific position in a space and has a first identification code (for example, $id_1$, $id_2$, $id_3$, . . . and $id_L$ of the plurality of luminaires, respectively). In one embodiment of the present disclosure, each of luminaire 108 is disposed at a specific position of the ceiling in an indoor environment. Each luminaire 108 not only provides an illumination, but also provides a reference point for positioning. Each luminaire 108 is controlled to be in an on or off state, and becomes light or dark accordingly. Each luminaire 108 emits a first identification code in a selected signal form, for example, the selected signal form of the luminaire 108 is a pulse type. Each positioning transceiver 106 has a second identification code IDn. The disclosure does not set a limit on the number of positioning transceivers 106, which depends on requirements and may be one or more.

The off state of a lighting device generally indicates a turn-off state. However, in accordance with the demodulation capability of the positioning transceiver 106, it is not necessary for the luminaire 108 in the disclosure to be completely turned off but just reduces the brightness of the luminaire 108, that is, the off state of the luminaire 108 is a state of reducing the brightness of the luminaire 108 and distinguishable from the on state. In other words, the on and off states of the luminaire 108 may tell the difference of the brightness, frequency, or phase between high level and low level.

The positioning transceiver 106 may be configured on a movable equipment or a body of staff 104. In one embodiment, the movable equipment may include at least one of a vital sign monitor, movable fetal monitor ultrasound perfusion pump, blood glucose meter and other equipment in a medical station. In another embodiment, the positioning transceiver 106 may be configured on the personal identification card or other objects carried by the staff 104. The architecture of positioning transceiver 106 will be described in more detail later.

Basically, the positioning transceiver 106 includes a receiving device which movably receives the first identification code and demodulates the first identification code. The positioning transceiver 106 further includes a wireless transceiver. The wireless transceiver transmits the first identification code $id_i$ and the second identification code IDn to a receiving terminal. In one embodiment, the receiving terminal may be a receiving end of a wireless network, therefore, may be connected to a server 110 via the wireless network. Therefore, the server 110 obtains the first identification code $id_i$ and the second identification code IDn by the receiving terminal and positions the positioning transceiver 106 in the space defined by the at least one luminaire 108.

The server 110 may receive the first identification code $id_i$ and the second identification code IDn by a connection scheme such as via a wireless network. After receiving the identification codes $id_i$ and IDn, the server 110 determines the position of the second identification code IDn according to the database which includes the position of the first identification code $id_i$ of the luminaire. In one embodiment, the server 110 also transmits the second identification code IDn to a display panel 150 in a monitoring center. The server 110 positions the positioning transceiver 106 corresponding to the building 152 or the staff carrying the positioning transceiver 106 corresponding to the relative position of the building 152.

Figure 2:
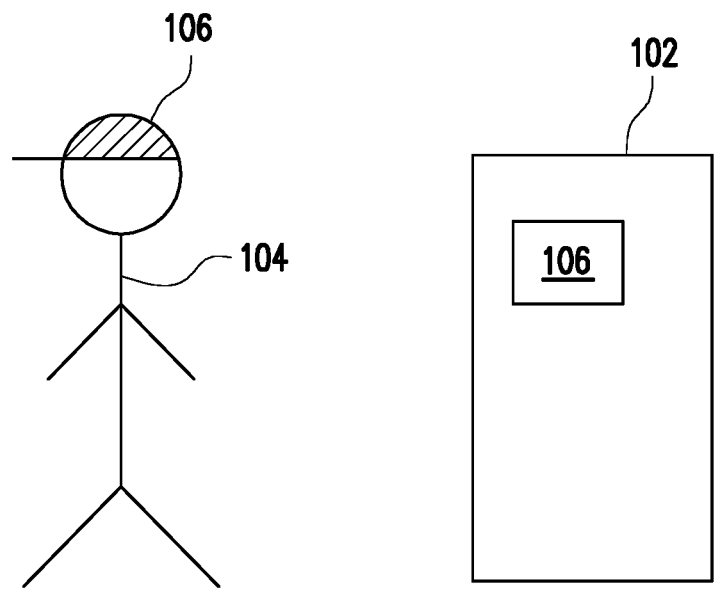
FIG. 2 illustrates a schematic diagram describing the arrangements of the positioning transceivers according to one embodiment of the disclosure.

The followings describe more details by embodiments. First, the arrangements of the positioning transceivers are described. FIG. 2 illustrates a schematic diagram describing the arrangements of the positioning transceivers according to one embodiment of the disclosure. Generally the positioning transceiver 106 may be set anywhere in the system, as long as it may receive the light emitted by the luminaire 108, and demodulate the first identification code. In the practical applications, the movable equipment 102 needs to keep monitoring at any time. Therefore, the positioning transceiver 106 may be disposed on the equipment (see FIG. 1). In another embodiment, the positioning transceiver 106 may be combined with a helmet which may be carried by staff 104 (see FIG. 2) at any time. Yet in another embodiment, the movable equipment 102 may be an identification card carried by the staff (see FIG. 2). So the identification card may be provided with the positioning transceiver 106. Therefore, the positioning transceiver 106 is disposed on the objects to be monitored. However, the ways of positioning the positioning transceiver may be, but not limited to those described in the aforesaid embodiments.

Figure 3:
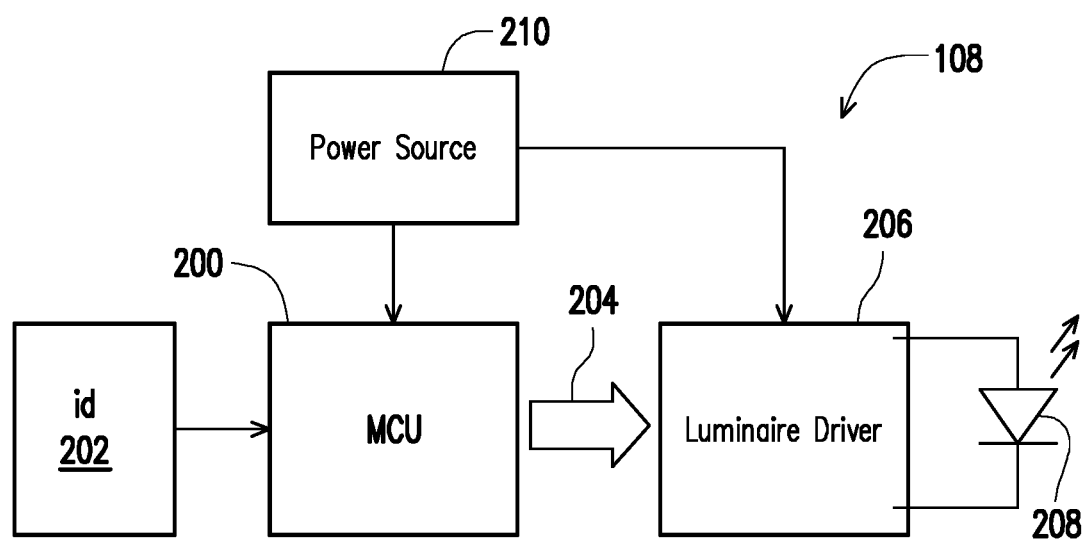
FIG. 3 illustrates a function block diagram of a luminaire according to one embodiment of the disclosure.

FIG. 3 illustrates a function block diagram of a luminaire according to one embodiment of the disclosure. Referring to FIG. 3, a micro control unit (MCU) 200 included in the luminaire 108 is used as the control center, and an identification code interface 202 included in in the luminaire 108 may allow the luminaire 108 to set its own identification code. The identification code of the luminaire 108 is also referred to as the first identification code ($id_i$). In one embodiment, the contents of the first identification code may be converted into a bit data such as an 8-bit data, by the micro control unit 200. The luminaire 108 has a plurality of light emitting devices, which may be, but not limited to light emitting diodes 208. The light emitting diodes 208 control a light state (on state) and a dark state (off state) by a pulse. The pulse corresponds to the bit data of the first identification code. In one embodiment, the micro control unit 200 provides the bit data 204 of the first identification code to a luminaire driver 206. The according to the bit data 204 such as "0" and "1". The luminaire driver 206 will control the light state and the dark state of the light emitting diodes 208, according to a time sequence corresponding to the content of the first identification code. Further, a power source 210 provides power to the micro control unit 200 and the luminaire driver 206. In this embodiment, it transmits the content of the first identification code by using the light state and dark state of the luminaire 108. In the following embodiment, the content of the first identification code is transmitted by using the Manchester encoding format.

Figure 4:
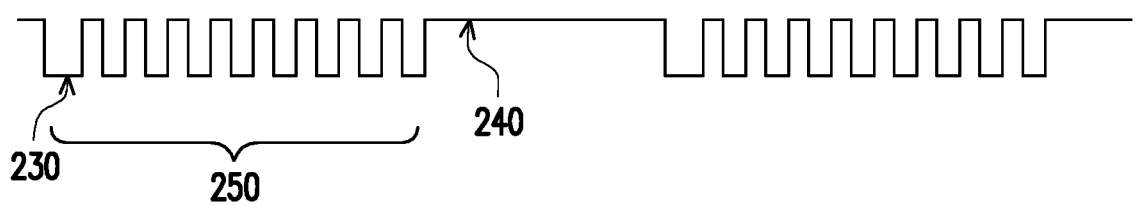
FIG. 4 illustrates a schematic diagram of the signal form of the Manchester encoding format according to one embodiment of the disclosure.

FIG. 4 illustrates a schematic diagram of the signal form of the Manchester encoding format according to one embodiment of the disclosure. Referring to FIG. 4, the Manchester encoding format is using a plurality of bits data as a data area 250 such as an 8-bit data area. There is a start zone 230 in the front of the data area 250 and an end zone 240 behind the data area 250. That is, the start and the end zone define the data area. Take the 8-bit data as an example, the data area 250 will contain eight cycles. The "0" or "1" represented by each cycle is determined by an intermediate transferred state. For example, from a high level to a low level represents a "0"; while from a low level to a high level represents a "1". In the embodiment of FIG. 4, the bit data is "11111111". The luminaire 108 will continue to send out the identification code, and this will not cause the flicker lighting for human eyes due to the high frequency changes.

It may be seen from the above description that using and controlling the light state and the dark state of the luminaire to respectively correspond to the high level and the low level of the bit data may realize the function of emitting the bit data.

Figure 5:
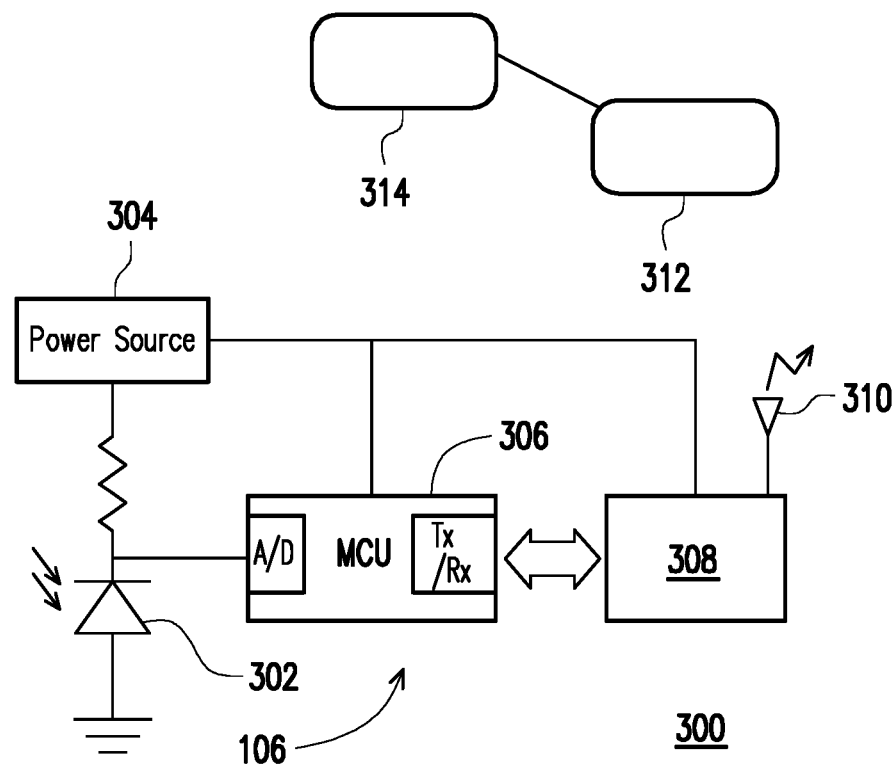
FIG. 5 illustrates a block diagram describing a connection between a positioning transceiver and a server according to one embodiment of the disclosure.

The following embodiments describe the function of the positioning transceiver and how to connect the positioning transceiver and the server. FIG. 5 illustrates a block diagram describing a connection between the positioning transceiver and the server according to one embodiment of the disclosure. Referring to FIG. 5, it describes the function 300 of the positioning transceiver 106 and how it connects a server 312 and a monitoring center 314 at the back end. In one embodiment, the positioning transceiver 106 may include a photosensitive unit 302, a power source 304, a micro control unit (MCU) 306, a wireless transceiver 308, and an antenna 310. The power source may be a battery to provide the power for the various components in the positioning transceiver 106. The photosensitive unit 302 may be a photosensitive diode or other similar function units. The photosensitive unit 302 senses the "light state" and "dark state" of the light emitted by the luminaires 108. The micro control unit (MCU) 306 demodulates the "light state" and "dark state" to be the contents of the first identification code (as the $id_i$ shown in FIG. 1) according to a predetermined clock cycle. In addition, the positioning transceiver 106 has a second identification code (as the IDn shown in FIG. 1). The first identification code and the second identification code are connected to the server 312 by the wireless transceiver 308 and the antenna 310. This connection scheme between the positioning transceiver 106 and the server 312 may be, but does not limit the scope of the disclosure.

The server 312 belongs to one of back-end applications. The server 312 receives the first identification code and knows the position of the luminaire having the first identification code from the database, according to the received first identification code, then further calculates the position of the positioning transceiver 106 having the second identification code, thereby positioning the positioning transceiver 106. Thereafter, the server 312 may transmit the position information to the monitoring center 314 for an overall management. At least, it may trace the motion of the positioning transceiver 106 relative to the building and real-time display the motion on a monitor screen. For the position of staff, for example, it may know whether a staff is located at a dangerous area Or not, so as to facilitate the monitoring center to trace and grasps the motions of the staff and the status of the environment that the staff is located in.

In addition, if the positioning transceiver 106 is located at an intersection area of two or more luminaires 108, it may simultaneously receive two or more light signals emitted by the two or more luminaires 108. The micro control unit (MCU) 306 of the positioning transceiver 106 will perform an identification in accordance with the strength of signals, and decide a corresponding luminaire 108 in accordance with predetermined rules. The scope of the disclosure does not limit on the determining scheme of positioning. In another embodiment, it may also maintain the previously sensed luminaire because luminaires 108 are generally close to each other. When leaving the previously sensed luminaire and substantially entering the range of another luminaire, a change will be made and the situation of the intersection area of the luminaires 108 is ignored.

The position transceiver 106 may also have more detecting functions and provide more monitoring information.

Figure 6:
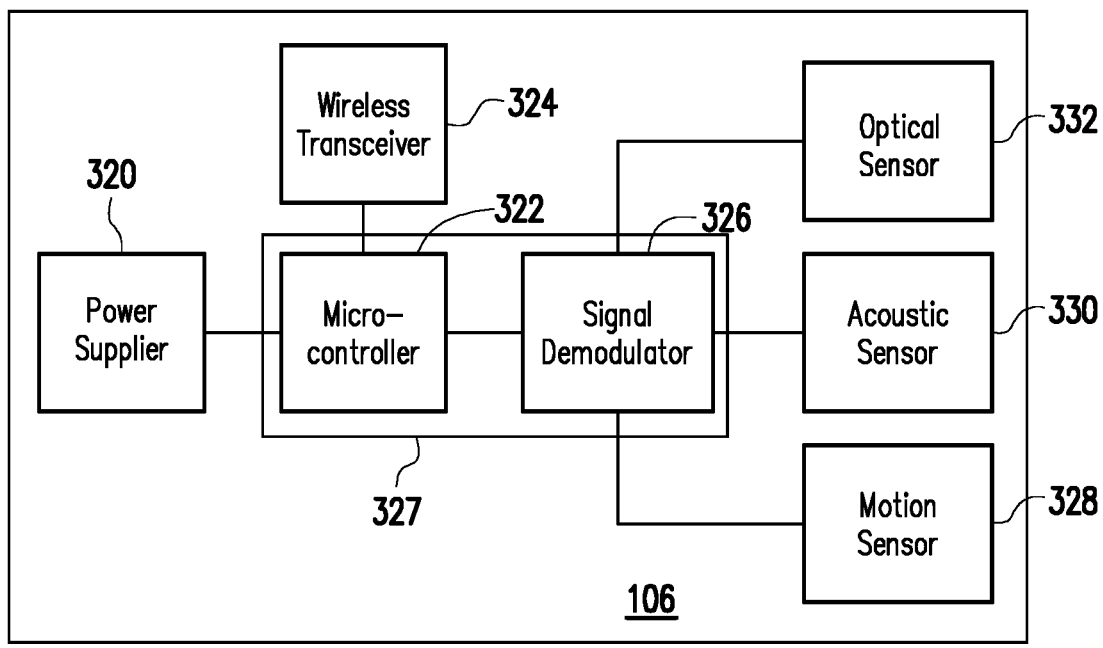
FIG. 6 illustrates a function block diagram of a positioning transceiver according to one embodiment of the disclosure.

FIG. 6 illustrates a function block diagram of a positioning transceiver according to one embodiment of the disclosure. Referring to FIG. 6, the positioning transceiver 106 may include a power supplier 320, a micro-controller 322, a signal demodulator 326, a wireless transceiver 324, an optical sensor 332, an acoustic sensor 330, and a motion sensor 328. The micro-controller 322 and the signal demodulator 326 may be integrated into a micro control unit 327. The function of the micro control unit 327 is similar to that of the MCU in FIG. 5. The function of the wireless transceiver 324 corresponds to that of the wireless transceiver 308 in FIG. 5. The optical sensor 332 may also correspond to the photosensitive unit 302 in FIG. 5. Therefore, the positioning transceiver 106 in this embodiment of FIG. 6 includes the same architecture and functions of the positioning transceiver 106 in FIG. 5. However, the positioning transceiver 106 in this embodiment of FIG. 6 further includes at least one of the acoustic sensor 330 and the motion sensor 328. The acoustic sensor 330 or the motion sensor 328 is connected to the signal demodulator 326 to obtain the sensing signal. Wherein, the acoustic sensor 330 may be used to sense the ambient sound of an environment at which the positioning transceiver 106 is located. For example, determining whether there is a warning sound, or an accident sound. It may timely control the danger or unexpected accident by the positioning information. The motion sensor 328 may be used to facilitate to determine whether an abnormal motion occurs or not. For example, the positioning transceiver 106 could be carried by the patient who needs to strengthen the monitoring. The patients may have a sudden illness and behave abnormally, such as falling, or jittering by sudden heart disease. The motion sensor 328 helps the monitoring center to timely grasp the position and the physical status of the patient.

The positioning system may be applied by a variety of ways. The embodiments of the disclosure may be applicable to the positioning system of shift of health care, which may comprise the management of luminaires, the management of staff and objects, the location analysis and trajectory analysis of equipment, the management and control of warning area. In addition, the disclosed techniques may also detect whether the luminaires and/or the equipment break down or not.

The embodiments of the disclosure may be also applicable to the guiding and recording system in an emergency center or a health check center, including the management of luminaires, the management of staff and objects, the trajectory analysis and time records of patients, the stay time of each station, and so on.

The embodiments of the disclosure may be also applicable to the positioning system of construction workers, including the management of luminaires, the setting of construction range, the setting of warning area, the trajectory analysis of staff, the time records, the management and control of warning area, the alarm detection systems, and so on.

However, applications of the disclosure may be, but not limited to the aforesaid applications. In accordance with the positioning system of the disclosure, practical applications may be integrated into a variety of compatible systems to enhance positioning and monitoring functions. Particularly in an indoor environment, the luminaire is necessary for providing the positioning of objects or staff directly.

Figure 7:
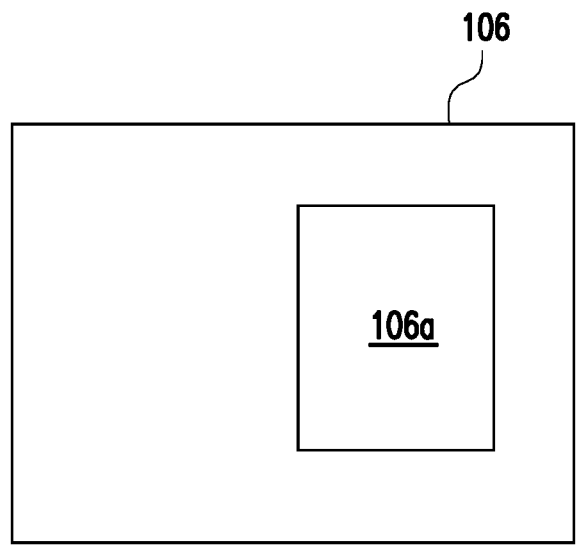
FIG. 7 illustrates a schematic diagram of a positioning transceiver according to one embodiment of the disclosure.

Regarding a further design on the positioning transceiver 106, it may consider on the power consumption to add the photoelectric conversion function to the positioning transceiver 106. FIG. 7 illustrates a schematic diagram of the positioning transceiver according to one embodiment of the disclosure. Referring to FIG. 7, the positioning transceiver 106 may be provided with a photoelectric conversion unit 106a. As the positioning transceiver 106 is generally in the lighting environment, it not only receives the light from the luminaire, but also receives the light from the sun. Therefore, the photoelectric conversion unit 106a may be a solar cell, which may convert a light energy to an electrical energy for the whole power use of the positioning transceiver 106. Thus, the positioning transceiver 106 may be provided with the power from the solar cell and increase the using time. Moreover, when the positioning transceiver 106 is placed in a bright environment, it may replace the power 304 of the battery of non-solar cell completely.

Figure 8:
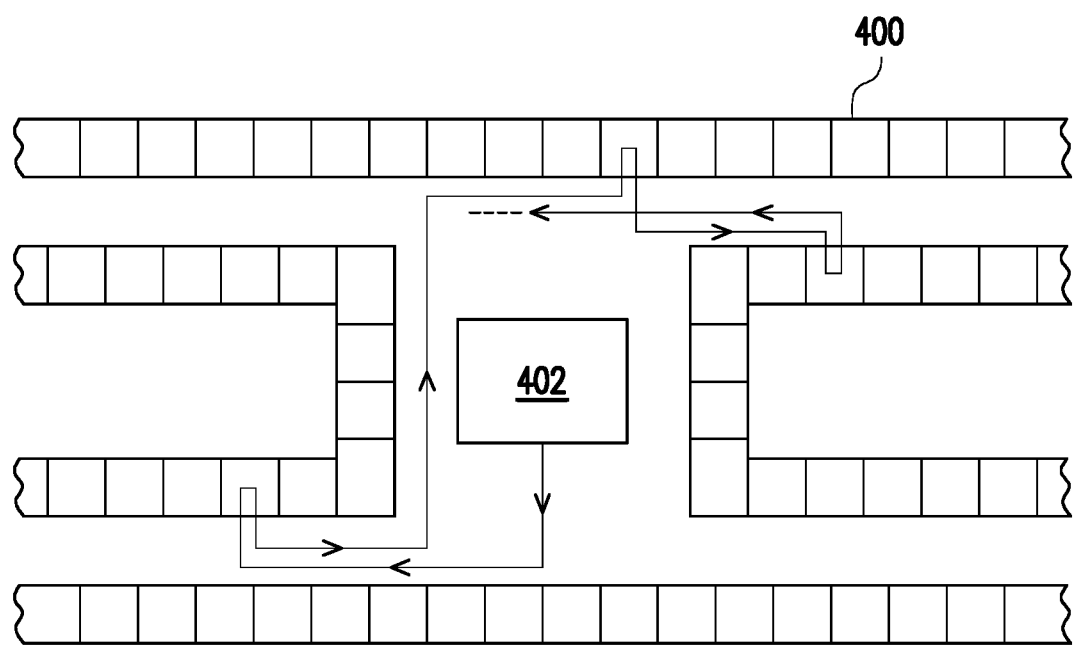
FIG. 8 illustrates a schematic diagram of one of applications of a positioning system using visible light according to an embodiment of the disclosure.

FIG. 8 illustrates a schematic diagram of an application of the positioning system according to another embodiment of the disclosure. Referring to FIG. 8, take one hospital floor as an example, there are buildings of connected wards 400 and a central medical station 402 on the hospital floor. There are corridors between the buildings of connected wards 400. Medical equipment may be moved from the central medical station 402 to the wards for routine processing. The positioning transceiver 106 may be disposed on the equipment or carried by staff. It may know the information of the trajectory of equipment or staff carrying the positioning transceivers 106, the time of residing in the wards and so on, according to the time and the position of the positioning transceivers 106. Moreover, the monitoring of the environmental state in the hospital building may be enhances if the function shown in FIG. 6 is cooperated.

In one embodiment, a positioning method comprises: disposing at least one luminaire in a space, wherein the at least one luminaire is disposed at a specific position and has a first identification code, and emits the first identification code in a selected signal form; configuring at least one positioning transceiver on a movable object, wherein each of the at least one positioning transceiver has a second identification code and further comprises receiving, by a receiving device, the first identification code, and demodulating the first identification code, and transmitting, by a wireless transceiver, the first identification code and the second identification code to a receiving terminal; and coupling, by the receiving terminal, to the wireless transceiver and a server, wherein the server obtains the first identification code and the second identification code, so as to position the at least one positioning transceiver in the space defined by the at least one luminaire.

In one embodiment of the positioning method, the selected signal form of the at least one luminaire uses a pulse form to shows an on state and an off state, so as to transmit a plurality of bit data of the first identification code.

In another embodiment of the positioning method, the selected signal form of the at least one luminaire shows the on state and the off state according to the pulse form of a Manchester encoding format, so as to transmit the plurality of bit data of the first identification code.

In one embodiment of the positioning method, the receiving device follows the selected signal form, and demodulates the first identification code according to a light-and-dark change of a light emitted by each of the at least one luminaire.

In one embodiment, the receiving device includes a photosensitive unit to demodulate the first identification code according to a light-and-dark change of the light emitted by a corresponding one of the at least one luminaire. In another embodiment, the photosensitive unit may demodulate the first identification code according to a switch between an on state and an off state of the at least one luminaire.

In one embodiment, the receiving device includes a photosensitive diode.

In the present embodiment, the position transceiver further includes a photoelectric conversion unit which converts a light energy to an electrical power for providing to the positioning transceiver. In one embodiment, the photoelectric conversion unit includes a solar cell.

In one embodiment, the positioning transceiver further includes a sound sensing unit. The acoustic sensor also transmits the sensing result of sound to the server. For example, the server may receive and analyze whether there is an abnormal warning sound coming from the location of the positioning transceiver or not.

In one embodiment, the position transceiver further includes a motion sensor. The motion sensor also transmits the sensing result to the server. For example, the server may receive and analyze whether the positioning transceiver occurs an abnormal motion or not.

In summary, the present embodiments of the positioning system and method by visible light utilize at least one luminaire having a lighting form to emit a specific first identification code, utilize at least one positioning transceiver to receive the light signal of the luminaire and demodulate the first identification code, and transmit a second identification code of the positioning transceiver to a server at the same time for performing the positioning and the environment monitoring. The embodiments of the disclosure may utilize the luminaire to perform the positioning in the indoor environment. In this way, the embodiments of the disclosure may be applicable to other applications, so as to provide positioning and monitoring functions.

It will be apparent to those skilled in the art that various modifications and variations can be made to the disclosed embodiments without departing from the scope or spirit of the disclosure. It is intended that the specification and examples be considered as exemplary embodiments only, with a scope of the disclosure being indicated by the following claims and their equivalents.

What is claimed is:

1. A positioning system, comprising:
   a plurality of luminaires, each of the luminaires producing an optical signal, having a first identification code in correspondingly illuminating;
   at least one positioning transceiver, receiving a plurality of the optical signals and determining one of the optical signals as received according to a signal strength, and transmitting the first identification code carried in the one of the optical signals as determined and a second identification code corresponding to the positioning transceiver;
   a server, receiving the first identification code and the second identification code, so to position the positioning transceiver according to the first identification code and the second identification code; and
   a display unit, configured to display a location of the positioning transceiver.

2. A positioning system, comprising:
   at least one luminaire, producing at least one optical signal, having a first identification code in correspondingly illuminating;
   at least one positioning transceiver, receiving the optical signal, and transmitting the first identification code and a second identification code corresponding to the positioning transceiver;

a signal modulator, to sense a signal, comprising acoustic signal and motion signal, used to indicate an ambient status;

a server, receiving the signal as sensed by the signal modulator, the first identification code and the second identification code, so to position the positioning transceiver according to the first identification code and the second identification code, and obtain the ambient status; and a display unit, configured to display a location of the positioning transceiver.

3. The positioning system as claimed in claim 1, wherein the optical signal is a pulse form.

4. The positioning system as claimed in claim 1, wherein the positioning transceiver comprises a receiving device, movably receiving the first identification code.

5. The positioning system as claimed in claim 4, wherein the receiving device comprises a photosensitive unit, to sense the optical signal emitted by the luminaire.

6. The positioning system as claimed in claim 4, wherein the receiving device modulates the first identification code.

7. The positioning system as claimed in claim 6, wherein the receiving device comprises a micro control unit, used to modulate the first identification code according to a predetermined clock cycle.

8. The positioning system as claimed in claim 7, wherein the micro control unit discerns the first identification code in accordance with a strength of the optical signal.

9. The positioning system as claimed in claim 4, wherein the positioning transceiver comprises a wireless transceiver, to transmit the first identification code and the second identification code to the server.

10. The positioning system as claimed in claim 1, wherein the server comprises a receiving terminal, the receiving terminal is coupled to the positioning transceiver to receive the first identification code and the second identification code.

11. The positioning system as claimed in claim 1, further comprising an identification code interface, to set the first identification code and the second identification code.

* * * * *